United States Patent

Bauer

[15] 3,646,645
[45] Mar. 7, 1972

[54] LOCKING DEVICE

[72] Inventor: Russell E. Bauer, Warren, Mich.

[73] Assignee: KDJ-Bauer Corporation, Warren, Mich.

[22] Filed: Oct. 30, 1969

[21] Appl. No.: 872,651

[52] U.S. Cl. .................................................24/241 SL
[51] Int. Cl. ..................................................A44b 13/00
[58] Field of Search .........................................24/239, 241;
294/19-24

[56] References Cited

UNITED STATES PATENTS

| 670,384 | 3/1901 | Clayton | 24/239 |
| 831,745 | 9/1906 | Rice | 24/239 UX |
| 3,271,510 | 9/1966 | Decker et al. | 24/239 X |

FOREIGN PATENTS OR APPLICATIONS

| 18,347 | 10/1898 | Great Britain | 24/241 SL |

*Primary Examiner*—Paul R. Gilliam
*Attorney*—Hauke, Gifford and Patalidis

[57] ABSTRACT

A remotely operable locking device having a block with a stud receiving slot which cooperates with a shiftable locking rod to form a locking engagement with the stud, the block having a plurality of bores, one of which is disposed transversely of the slot and having the locking rod slidably movable therein from a first position for retaining the stud within the slot to a second position for releasing the stud from the slot and another of the bores being disposed transversely of the first bore and having a detent mechanism slidably movable therein for engaging the locking rod when the same is moved to its second position. A third bore disposed transversely of the detent mechanism has a pivotably mounted lever which is adapted to disengage the detent mechanism from the locking rod in response to the positioning of the stud within the slot whereupon a biasing means shifts the locking rod to its first position whereby the stud is retained within the slot.

6 Claims, 5 Drawing Figures

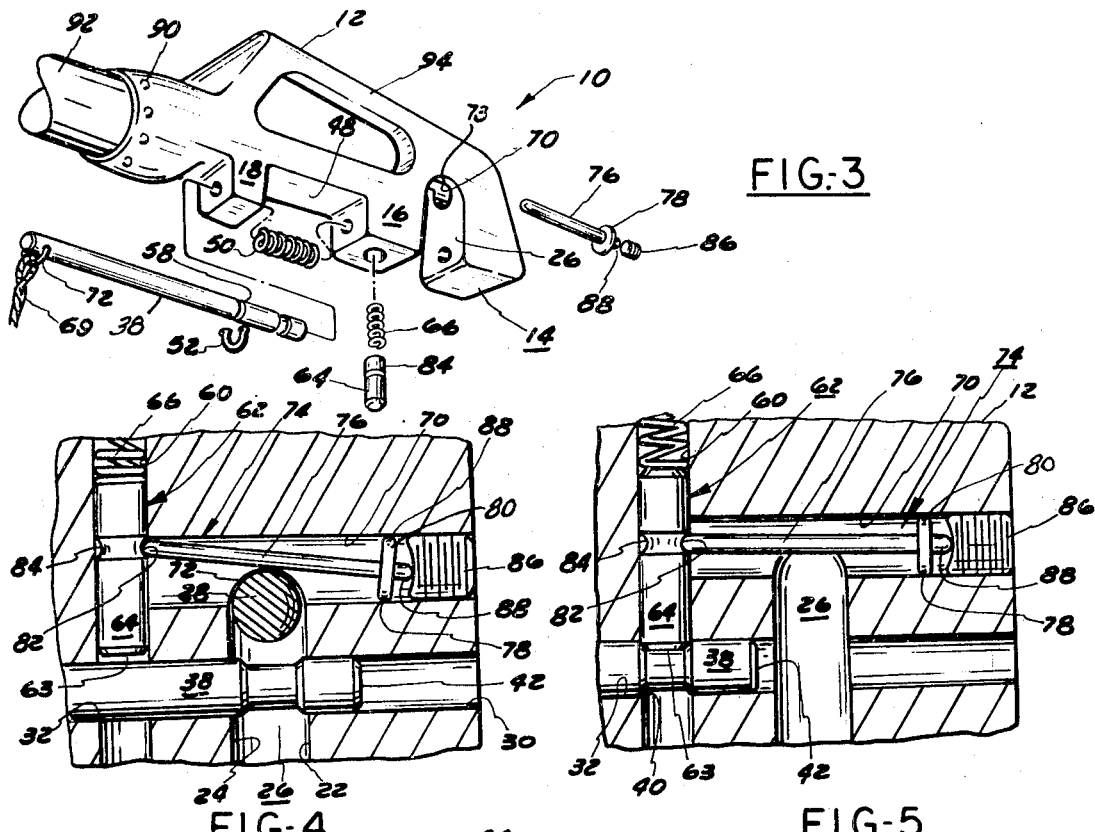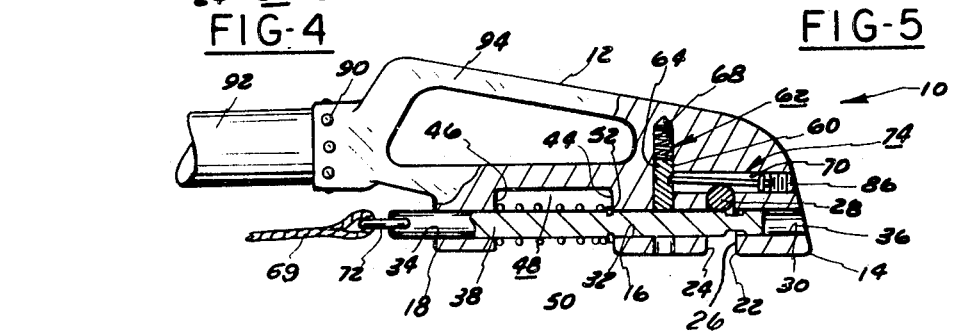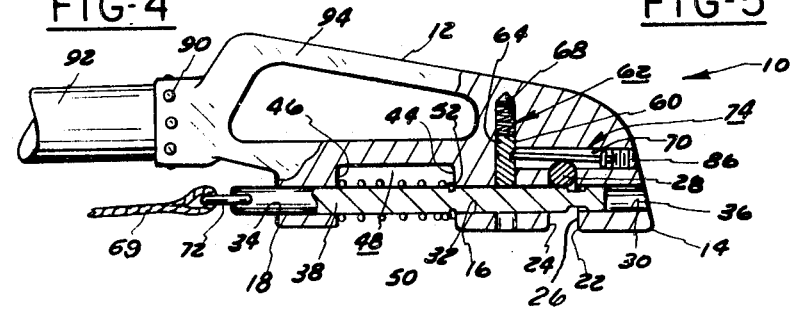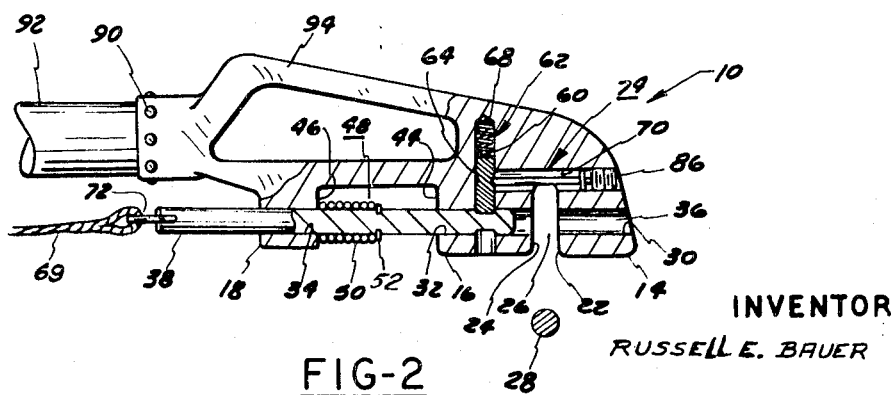

LOCKING DEVICE

BACKGROUND OF THE INVENTION

1. Field of the Invention

This invention relates to locking devices and more particularly to a locking mechanism which may be remotely operated.

2. Description of the Prior Art

In various applications it is desirable to bring two items into a locking engagement and/or disengagement wherein the operator is at large distance from the point of engagement. One such application is that of securing the spinnaker of a sailing vessel wherein the operator of the vessel is required to transfer the spinnaker from one side of the vessel to the other side of the vessel during certain maneuvers, as, for example, when the vessel is turned into the wind. Generally, the spinnaker is tied down to the vessel and must be untied, transferred and retied to the other side of the vessel, all of which may prove to be cumbersome and difficult when the vessel is being operated by a lone operator, as the operator must also simultaneously operate the vessel's tiller and mainsail. It would therefore be very desirable to provide a locking device which can be disengaged manually from a distance and one which would automatically come into a locking engagement upon contact with the fixture with which locking is desired. No such locking device is disclosed in the prior art.

SUMMARY OF THE INVENTION

The present invention which will be described in more detail hereinafter comprises a block having a stud receiving slot adapted to cooperate with a transversely extending locking rod to retain the stud within the slot. The block is provided with a plurality of intersecting bores, one of which has the rod slidably mounted therein and movable from a first position for retaining the stud within the slot to a second position wherein the stud may be removed from the slot. A detent disposed in another of the bores engages the locking rod when the same is in its second position. A pivotably mounted lever associated with the slot is responsive to the insertion of the stud therein so as to disengage the detent from the locking rod whereupon a spring member shifts the locking rod to its first position for retaining the stud within the slot.

It is therefore an object of this invention to provide a new and improved locking device which may be remotely operated.

Other applications, objects, and advantages of the present invention will be become apparent by the following detailed description of the preferred embodiment.

DESCRIPTION OF THE DRAWING

The description makes reference to the accompanying drawing in which like reference characters refer to like parts throughout the several views, and in which:

FIG. 1 is an elevational view of an example of a locking device according to the invention with portions broken away to show the internal construction and in which the locking device is shown in a locked position;

FIG. 2 is a view similar to FIG. 1 but showing the device in an unlocked position;

FIG. 3 is a perspective exploded view of the device shown in FIGS. 1 and 2;

FIG. 4 is an enlarged fragmentary view of the lever and detent mechanism as shown in FIG. 1; and FIG. 5 is an enlarged fragmentary view of the lever and detent mechanism as shown in FIG. 2.

DESCRIPTION OF THE PREFERRED EMBODIMENT

Referring to FIGS. 1 and 2 for a detailed description of one example of the present invention, there is shown a locking device 10 which comprises a block 12 having extended sections 14, 16 and 18. The opposite sidewalls 22 and 24 respectively of the extended sections 14 and 16 form a slot 26 which is adapted to receive and retain a stud 28 in a manner to be described hereinafter.

The stud 28 is representative of a variety of elements such as ropes, cables, hooks and lugs to which the locking device 10 may be attached. Axially aligned bores 30, 32 and 34 respectively disposed in the extended sections 14, 16 and 18 together form a mounting bore 36 in which a locking rod 38 is slidably disposed. The locking rod 38 is of an elongated cylindrical shape and is provided with a peripheral groove 40 near one end 42 (FIGS. 4 and 5). The locking rod 38 is adapted to be shifted within the mounting bore 36 from a first position wherein the rod end 42 is disposed within the bore 30 to a second position wherein the rod end 42 is disposed within the bore 32.

Opposite sidewalls 44 and 46 respectively of the extended sections 16 and 18 form a second slot 48 which is generally aligned with the mounting bore 36 and is of such a size as to accommodate a coil type compression spring 50 which surrounds the locking rod 38. Spring 50 is disposed between the extending section walls 46 and a snap ring 52. The snap ring 52 is carried within a peripheral groove 58 formed on the locking rod 38. The spring 50 is designed such as to bias the locking rod 38 rightwardly (as viewed in the drawing) so that the locking rod 38 extends across the slot 26 and the locking rod end 42 projects within the bore 30 as illustrated in FIGS. 1 and 4. The abutment of the snap ring 52 against the extended section wall 44 limits the rightwardly movement of the locking rod 38.

A blind bore 60 disposed within the block 12 and extending through the extended section 16 transversely of the mounting bore 36 has a detent mechanism 62 which may take the form of a pin 64 (FIGS. 4 and 5) slidably mounted within the bore 60. One end 63 of the pin 64 is biased toward the locking rod 38 by means of a compression spring 66 which is disposed between the other end of the pin 64 and the blind end 68, FIGS. 1 and 2, of the blind bore 60.

A rope 69 attached to the locking rod 38 as shown at 72 is utilized to retract the locking rod 38 against the biasing force of the spring 50 compressing the same until the peripheral groove 40 is aligned with the blind bore 60 whereupon the spring 66 urges the end 63 of the pin 64 into a locking engagement with the peripheral groove 40 to retain the locking rod 38 in the retracted position illustrated in FIGS. 2 and 5.

A third bore 70 extending transversely of the blind bore 60 and the detent mechanism 62 intersects the slot 26 at its end wall 73. A lever 74 mounted within the bore 70 may take the form of a pin 76 (FIGS. 4 and 5) having a disc 78 attached to one end thereof. The disc 78 is provided with slightly rounded edges 80 to enable the lever 74 to be pivoted within the bore 70. The opposite end 82 of the pin 76 is secured by any suitable means to the detent pin 64 as for example the end may engage a peripheral groove 84 formed on the pin 64.

A setscrew 86 threaded into the bore 70 urges the end 82 of the pin 76 into engagement with the detent pin groove 84. A small extension 88 of the pin 76 disposed between the disc 78 and the set screw 86 provides adequate clearance to permit the disc 78 to be pivoted within the bore 70 without abutting against the end of the setscrew 86.

The block 12 is attached by any suitable means such as rivets 90 to the end of an extension pole 92. The extension pole 92 allows the user to engage the locking device 10 upon the stud 28 when the same is at a distance which is not directly accessible to the user. The block 12 is also provided with a handgrip 94 which permits the user to grasp the block and use the same when the stud is accessible.

Operation of the locking device 10 effected by retracting the locking rod 38 by means of the rope 69 until the detent pin 64 engages the locking rod groove 40. In a retracted position the locking rod end 42 is completely within the extended section bore 32 and the slot 26 is unobstructed. The locking device 10 is positioned to receive the stud 28 within the slot 26 and as the stud 28 is moved inwardly toward the slot end wall 72 it abuts the lever pin 76 and pivots the same by means of the disc 78 upwardly and away from the slot 26 as illustrated in FIG. 4. As a lever pin 76 is pivoted at one end, its opposite end 82 which is carried by the detent pin 64 shifts the detent pin 64 against the biasing force of the spring 66 until the detent pin 64 is disengaged from the locking rod peripheral groove 40. Upon disengagement of the detent pin 64 from the groove 40 the locking rod 38 is shifted rightwardly (as seen in the drawing) across the slot 26 by means of the spring 50 until the snap ring 52 abuts the extending section wall 44. In this position the locking rod 38 extends across the slot 26 and the locking rod end 42 is within the extended section bore 30 as illustrated in FIGS. 1 and 4. The stud 28 remains locked within the slot 26 until the locking rod 38 is again retracted by means of the rope 69.

In certain applications the rope 69 may be replaced by other means for retracting the locking rod 38, such as an electrically operated solenoid which is automatically deactivated after the locking rod groove 40 is engaged by the detent pin 64.

Having thus described this invention, what is claimed is:

1. A locking device for use in cooperation with a stud comprising a block having a slot provided with an open end which is adapted to receive said stud; a locking member movable from a first position for retaining said stud in said slot by closing the open end of said slot to a second position for releasing said stud from said slot; means normally biasing said locking member to said first position; detent means adapted to engage said locking member for retaining said locking member in said second position; means associated with said slot and responsive to the presence of said stud within said slot for disengaging said detent means from said locking member; and means for moving said locking member to said second position against the action of said biasing means for opening the open end of said slot for disengaging said stud from said slot, wherein said means associated with said slot comprises a lever having an end which is pivotably mounted within said block and another end which is carried by said detent means, said stud being adapted to engage said lever when inserted in said slot so as to shift said detent means out of engagement with said locking member whereby said biasing means moves said locking member to said first position.

2. The locking device claimed in claim 1, wherein said block includes a plurality of bores, one of which is disposed transversely of said slot, said locking member being slidably disposed in said one bore and movable from said first position to said second position; another of said bores being disposed transversely of said one bore, said detent means being slidably disposed in said other bore and engaging said locking member to prevent movement thereof when said locking member is in said second position; and second biasing means for biasing said detent into engagement with said locking member.

3. The locking device claimed in claim 2, wherein a third bore is disposed transversely of said detent means with a portion of said third bore opening into said slot; said means associated with said slot comprising a lever one end of which is pivotably mounted in said third bore, the other end of which is carried by said detent means, said stud being adapted to engage said lever when inserted in said slot so as to shift said detent means out of engagement with said locking member, whereby said first biasing means moves said locking member to said first position.

4. The locking device claimed in claim 3 wherein said locking member comprises a rod slidably mounted in said one bore, said rod having a groove formed thereon; said detent means engaging said groove for retaining said rod in said second position.

5. The locking device claimed in claim 4, wherein said rod is spring biased to said first position, and said rod is manually moved from said first position to said second position.

6. The locking device claimed in claim 5, wherein said detent means comprises a second rod slidably disposed in said other bore, one end of said rod being spring biased into engagement with said groove when said first mentioned rod is in said second position.

* * * * *

UNITED STATES PATENT OFFICE
CERTIFICATE OF CORRECTION

Patent No. 3,646,645            Dated March 7, 1972

Inventor(s) Russell E. Bauer

It is certified that error appears in the above-identified patent and that said Letters Patent are hereby corrected as shown below:

Change assignee "KDJ-Bauer Corporation" to

--KDI-Bauer Corporation-- .

Signed and sealed this 11th day of July 1972.

(SEAL)
Attest:

EDWARD M. FLETCHER, JR.      ROBERT GOTTSCHALK
Attesting Officer               Commissioner of Patents